United States Patent
Gahleitner et al.

(10) Patent No.: US 9,487,606 B2
(45) Date of Patent: *Nov. 8, 2016

(54) RANDOM PROPYLENE COPOLYMER FOR BOTTLES WITH GOOD OPTICAL PROPERTIES AND LOW HEXANE CONTENT

(71) Applicant: Borealis AG, Vienna (AT)

(72) Inventors: Markus Gahleitner, Neuhofen/Krems (AT); Katja Klimke, Linz (AT); Klaus Bernreitner, Linz (AT); Martina Sandholzer, Linz (AT)

(73) Assignee: Borealis, AG (AT)

( * ) Notice: Subject to any disclaimer, the term of this patent is extended or adjusted under 35 U.S.C. 154(b) by 0 days.

This patent is subject to a terminal disclaimer.

(21) Appl. No.: 14/441,141

(22) PCT Filed: Nov. 6, 2013

(86) PCT No.: PCT/EP2013/073177
§ 371 (c)(1),
(2) Date: May 6, 2015

(87) PCT Pub. No.: WO2014/075972
PCT Pub. Date: May 22, 2014

(65) Prior Publication Data
US 2015/0259454 A1    Sep. 17, 2015

(30) Foreign Application Priority Data
Nov. 16, 2012  (EP) ..................................... 12193064

(51) Int. Cl.
*C08F 210/04* (2006.01)
*C08F 210/08* (2006.01)
*C08F 210/06* (2006.01)
*C08L 23/14* (2006.01)

(52) U.S. Cl.
CPC ........... *C08F 210/08* (2013.01); *C08F 210/06* (2013.01); *C08L 23/14* (2013.01); *C08L 23/142* (2013.01); *Y10T 428/1397* (2015.01)

(58) Field of Classification Search
CPC .............................. C08F 210/08; C08F 210/06
USPC ....................................................... 526/348.6
See application file for complete search history.

(56) References Cited

U.S. PATENT DOCUMENTS

| 6,300,415 B1 | 10/2001 | Okayama et al. |
| 2008/0207835 A1 * | 8/2008 | Vestberg ............... C08F 210/16 525/240 |

FOREIGN PATENT DOCUMENTS

| EP | 0863183 A1 | 9/1998 |
| EP | 1681315 A1 | 7/2006 |
| EP | 2508562 A1 | 10/2012 |
| WO | 0136502 A1 | 5/2001 |
| WO | 2008068113 A1 | 6/2008 |
| WO | 2008141934 A1 | 11/2008 |
| WO | 2014075973 A1 | 5/2014 |

OTHER PUBLICATIONS

Japanese Office Action dated Dec. 3, 2015.
Pasquini, Neil, Polypropylene Handbook, 2nd Edition, 2005, p. 445.

* cited by examiner

*Primary Examiner* — Hui Chin
(74) *Attorney, Agent, or Firm* — Tarolli, Sundheim, Covell & Tummino LLP

(57) ABSTRACT

Propylene copolymer having a melt flow rate $MFR_2$ (230° C.) in the range of more than 0.8 to below 2.5 g/10 min, a xylene cold soluble content (XCS) in the range of 25.0 to 35.0 wt.-%, a comonomer content in the range of more than 4.5 to 10.0 wt.-%, wherein further the xylene cold soluble (XCS) fraction of the propylene copolymer has comonomer content in the range of 12.0 to 22.0 wt.-% and the xylene cold insoluble (XCI) fraction of the propylene copolymer has a Mw/Mn of more than 4.9 to 10.0.

17 Claims, No Drawings

RANDOM PROPYLENE COPOLYMER FOR BOTTLES WITH GOOD OPTICAL PROPERTIES AND LOW HEXANE CONTENT

The present invention is directed to a new soft propylene copolymer as well as to extrusion blow molded articles comprising the new soft propylene copolymer.

Polymers are increasingly used in different demanding applications. At the same time there is a continuous seek for tailored polymers which meet the requirements of these applications. The demands can be challenging, since many polymer properties are directly or indirectly interrelated. For instance, heterophasic systems are known for their good impact behavior. Such heterophasic propylene copolymers comprise a matrix being either a propylene homopolymer or a random propylene copolymer in which an elastomeric copolymer is dispersed. Thus the polypropylene matrix contains (finely) dispersed inclusions being not part of the matrix and said inclusions contain the elastomeric copolymer. The term "inclusion" according indicates that the matrix and the inclusion form different phases within the heterophasic system, said inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Soft heterophasic systems which enable a skilled artisan to produce transparent and sterilisable extrusion blow moulded articles are still a challenge.

A specific soft heterophasic propylene copolymer is described in WO 2008/141934 A1. This heterophasic propylene copolymer has a rather low melting temperature and low stiffness.

However in the field of extrusion blow molded articles good optical properties are required. It had become clear in the meantime that haze should not be the only value to be used for judging the quality of the optical properties of extrusion blow molded articles. For instance it has been recognized that the visual appearance of extrusion molded articles is inacceptable even though the haze values have been rather low. Thus it became clear that the haze values alone were not enough to judge the optical appearance of the bottles and hence a new parameter, the so-called bottle appearance factor (BAF), was defined as BAF= (clarity*gloss)/haze.

Beside the optical properties the hexane soluble content of soft heterophasic propylene copolymers is a critical issue. However a low hexane content is an indispensable requirement in the food and health sector.

Accordingly it is the object of the present invention to provide a propylene copolymer with good optical properties, i.e. with a high BAF value, paired with an acceptable hexane content.

The finding of the present invention is to provide a propylene copolymer with rather high overall comonomer content but moderate xylene cold soluble (XCS) content. Further the propylene content in the xylene cold soluble (XCS) fraction should be rather high. A further finding is that especially good results are obtained if the matrix of the propylene copolymer is feature by a bimodal comonomer content and molecular weight distribution.

Accordingly, in a first aspect the present invention is directed to a propylene copolymer having (a) a melt flow rate $MFR_2$ (230° C.) measured according to ISO 1133 in the range of more than 0.8 to below 2.5 g/10 min,
(b) a xylene cold soluble content (XCS) determined according ISO 16152 (25° C.) in the range of 25.0 to 35.0 wt.-%, and
(c) a comonomer content in the range of more than 4.5 to 10.0 wt.-%, wherein further
(d) the comonomer content of xylene cold soluble (XCS) fraction of the propylene copolymer is in the range of 12.0 to 22.0 wt.-%, and
(e) the intrinsic viscosity (IV) determined according to DIN ISO 1628/1 (in decalin at 135° C.) of the xylene cold soluble (XCS) fraction of the propylene copolymer is in the range of more than 1.5 to below 3.0 dl/g Preferably the xylene cold insoluble (XCI) fraction of the propylene copolymer according to the first aspect has a polydispersity (Mw/Mn) of more than 4.9 to 10.0.

In a second aspect the present invention is directed to a propylene copolymer having (a) a melt flow rate $MFR_2$ (230° C.) measured according to ISO 1133 in the range of more than 0.8 to below 2.5 g/10 min,
(b) a xylene cold soluble content (XCS) determined according ISO 16152 (25° C.) in the range of 25.0 to 35.0 wt.-%, and
(c) a comonomer content in the range of more than 4.5 to 10.0 wt.-%, wherein further
(d) the comonomer content of xylene cold soluble (XCS) fraction of the propylene copolymer is in the range of 12.0 to 22.0 wt.-%, and
(e) the xylene cold insoluble (XCI) fraction of the propylene copolymer has a polydispersity (Mw/Mn) of more than 4.9 to 10.0.

Preferably the xylene cold soluble (XCS) fraction of the propylene copolymer according to the second aspect has an intrinsic viscosity (IV) determined according to DIN ISO 1628/1 (in decalin at 135° C.) is in the range of more than 1.5 to below 3.0 dl/g.

Preferably, the propylene copolymer according to the first and second embodiment is α-nucleated, i.e. comprises an α-nucleating agent.

It has surprisingly been found that such propylene copolymer has very high BAF values and relatively low hexane solubles.

In the following the first aspect and second aspect of the present invention are defined in more detail together.

The propylene copolymer comprises apart from propylene also comonomers. Preferably the propylene copolymer comprises apart from propylene ethylene and/or $C_4$ to $C_{12}$ α-olefins.

Accordingly the term "propylene copolymer" according to this invention is understood as a polypropylene comprising, preferably consisting of, units derivable from (a) propylene
and
(b) ethylene and/or $C_4$ to $C_{12}$ α-olefins.

Thus the propylene copolymer according to this invention comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the propylene copolymer according to this invention comprises, especially consists of, monomers copolymerizable with propylene from the group consisting of ethylene, 1-butene and 1-hexene. More specifically the propylene copolymer of this invention comprises—apart from propylene—units derivable from ethylene and/or 1-butene. In a preferred embodiment the propylene copolymer according to this invention comprises units derivable from ethylene and propylene only.

Additionally it is appreciated that the propylene copolymer preferably has a comonomer content in a very specific range which contributes to the softness and good optical properties. Thus it is required that the comonomer content of the propylene copolymer is in the range of 4.5 to 10.0 wt.-%, like in the range of 4.5 to below 10.0 wt.-%, more preferably in the range of 4.5 to 9.5 wt.-%, yet more preferably in the range of equal or more than 5.0 to 9.0 wt.-%, like in the range of equal or more than 6.0 to 9.0 wt.-%.

The propylene copolymer of the instant invention can be further defined by the amount of comonomers within the xylene cold soluble (XCS) fraction. Accordingly it is preferred that the comonomer content in the xylene cold soluble fraction (XCS) of the propylene copolymer is rather low. Thus it is appreciated that the comonomer content of the xylene cold soluble fraction (XCS) of the propylene copolymer is in the range of 12.0 to 22.0 wt.-%, yet more preferably in the range of 14.0 to 20.0 wt.-%, still more preferably in the range of 15.0 to 19.0 wt.-%.

Concerning the comonomers present in the xylene cold soluble fraction (XCS) it is referred to the information provided for the propylene copolymer. Accordingly in a specific embodiment the xylene cold soluble fraction (XCS) comprises, especially consists of, monomers copolymerizable with propylene from the group consisting of ethylene, 1-butene and 1-hexene. More specifically the xylene cold soluble fraction (XCS) comprises—apart from propylene—units derivable from ethylene and/or 1-butene. In a preferred embodiment the xylene cold soluble fraction (XCS) comprises units derivable from ethylene and propylene only.

Considering the information provided above, it is preferred that the propylene copolymer fulfills inequation (I), more preferably inequation (Ia), yet more preferably inequation (Ib), still more preferably inequation (Ic), $$\frac{Co(\text{total})}{Co(XCS)} \leq 0.55, \quad \text{(I)}$$

$$\frac{Co(\text{total})}{Co(XCS)} \leq 0.50, \quad \text{(Ia)}$$

$$0.20 \leq \frac{Co(\text{total})}{Co(XCS)} \leq 0.55, \quad \text{(Ib)}$$

$$0.30 \leq \frac{Co(\text{total})}{Co(XCS)} \leq 0.50, \quad \text{(Ic)}$$

wherein

Co (total) is the comonomer content [wt.-%] of the propylene copolymer

Co (XCS) is the comonomer content [wt.-%] of the xylene cold soluble fraction (XCS) of the propylene copolymer.

Further it is appreciated that the xylene cold soluble (XCS) fraction of the propylene copolymer is specified by its intrinsic viscosity. A low intrinsic viscosity (IV) value reflects a low weight average molecular weight. For the present invention it is preferably required that the xylene cold soluble fraction (XCS) of propylene copolymer has an intrinsic viscosity (IV) measured according to ISO 1628/1 (at 135° C. in decalin) in the range of 1.5 to 3.0 dl/g, like in the range of 1.7 to below 2.8 dl/g, more preferably in the range of 1.8 to 2.7 dl/g.

Another characteristic feature of the instant propylene copolymer is its rather moderate xylene cold soluble (XCS) fraction. Accordingly it is appreciated that the propylene copolymer has a xylene cold soluble fraction in the range of 25.0 to 35.0 wt.-%, like in the range of 25.0 to below 35.0 wt.-%, more preferably in the range of 27.0 to 34.0 wt.-%, yet more preferably in the range of equal or more than 28.0 to 33.5 wt.-%.

The part of the propylene copolymer which is not soluble in cold xylene is the xylene cold insoluble (XCI) fraction. Preferably also this fraction preferably exhibits some specific properties.

Accordingly it is preferred that the polydispersity (Mw/Mn) of the cold insoluble fraction (XCI) of the propylene copolymer is in the range of more than 4.9 to 10.0, more preferably in the range of 5.0 to 9.0, still more preferably in the range of 5.0 to 8.0.

In one preferred embodiment the comonomer content, preferably ethylene content, in the cold insoluble fraction (XCI) of the propylene copolymer is in the range of 3.0 to 7.0 wt.-%, yet more preferably in the range of 3.5 to 6.0 wt.-%.

Further it is preferred that the comonomer content, preferably ethylene content, in both fractions is in a specific ratio to each other. Accordingly it is preferred that the propylene copolymer fulfills inequation (II) more preferably inequation (IIa), yet more preferably inequation (IIb), $$2.8 \leq \frac{Co(XCS)}{Co(XCI)} \leq 5.5 \quad \text{(II)}$$

$$3.0 \leq \frac{Co(XCS)}{Co(XCI)} \leq 5.0 \quad \text{(IIa)}$$

$$3.2 \leq \frac{Co(XCS)}{Co(XCI)} \leq 4.8 \quad \text{(IIb)}$$

wherein

Co (XCS) is the comonomer content [wt.-%] of the xylene cold soluble (XCS) of the propylene copolymer, Co (XCI) is the comonomer content [wt.-%] of the xylene cold insoluble (XCI) of the propylene copolymer.

Preferably it is desired that the propylene copolymer is thermo mechanically stable, so that for instance a thermal sterilization process can be accomplished. Accordingly it is appreciated that the propylene copolymer has a melting temperature of at least 145° C., more preferably in the range of 148 to 159° C., still more preferably in the range of 149 to 157° C., like in the range of 149 to 155° C.

The propylene copolymer according to this invention is further featured by a rather low melt flow rate $MFR_2$ (230° C.). Accordingly the propylene copolymer has a melt flow rate $MFR_2$ (230° C.) measured according to ISO 1133 in the range of more than 0.8 to 2.5 g/10 min, more preferably in the range of more than 1.0 to 2.2 g/10 min, still more preferably in the range of 1.2 to 2.0 g/10 min.

The instant propylene copolymer is especially further featured by its specific optical properties. Accordingly the propylene copolymer has a bottle appearance factor (BAF) of formula (I), (Ia), (Ib)

$$BAF = \frac{C \times G}{H} > 8 \quad \text{(I)}$$

$$BAF = \frac{C \times G}{H} > 10 \quad \text{(Ia)}$$

$$BAF = \frac{C \times G}{H} > 15 \quad \text{(Ib)}$$

wherein
H is the haze value
C is the clarity value,
G is the gloss value,
wherein further
the haze, the clarity and the gloss are determined according to ASTM D 1003-07 on a test specimen of 0.3×60×60 mm³ size cut from a bottle having a wall thickness of 0.3 mm made from the propylene copolymer of the instant invention.

Further it is preferred that the propylene copolymer has an hexane soluble content of below 5.5 wt.-%, more preferably in the range of 0.5 to below 5.5 wt.-%, still more preferably in the range of 2.0 to 5.2 wt.-%, like in the range of 2.0 to 5.0 wt.-%.

As indicated above, the instant propylene copolymer is featured by a considerable amount of a xylene cold soluble (XCS) fraction. On the other hand the propylene copolymer is also preferably featured by a rather high amount of a crystalline fraction melting at high temperature. Accordingly the instant propylene copolymer is a mixture of a crystalline polymer and amorphous material. Such type of polymer is classified as heterophasic propylene copolymer. A heterophasic propylene copolymer comprises a polymer matrix, like a (semi)crystalline polypropylene, in which the amorphous material, like an elastomeric propylene copolymer, is dispersed. Thus in a preferred embodiment the instant propylene copolymer is heterophasic propylene copolymer (RAHECO). More precisely the instant propylene copolymer is heterophasic propylene copolymer (RAHECO) comprising a matrix (M) being a random propylene copolymer (R-PP) and dispersed therein an elastomeric propylene copolymer (E). Thus the matrix (M) contains (finely) dispersed inclusions being not part of the matrix (M) and said inclusions contain the elastomeric propylene copolymer (E). The term "inclusion" according to this invention shall preferably indicate that the matrix and the inclusion form different phases within the heterophasic propylene copolymer (RAHECO), said inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Preferably the heterophasic propylene copolymer (RAHECO) according to this invention comprises as polymer components only the random propylene copolymer (R-PP) and the elastomeric propylene copolymer (E). In other words the heterophasic propylene copolymer (RAHECO) may contain further additives, especially α-nucleating agents, but no other polymer in an amount exceeding 5 wt-%, more preferably exceeding 3 wt.-%, like exceeding 1 wt.-%, based on the total heterophasic propylene copolymer (RAHECO). One additional polymer which may be present in such low amounts is a polyethylene which is a by-reaction product obtained by the preparation of heterophasic propylene copolymer (RAHECO) (see in detail below). Accordingly it is in particular appreciated that the instant heterophasic propylene copolymer (RAHECO) contains only the random propylene copolymer (R-PP), the elastomeric propylene copolymer (E) and optionally polyethylene in amounts as mentioned in this paragraph.

Preferably the weight ratio between the matrix (M), i.e. the random propylene copolymer (R-PP), and the elastomeric propylene copolymer (E) is 60/40 to 90/10, more preferably 70/30 to 85/15, yet more preferably 75/25 to 85/15.

In the following the random propylene copolymer (R-PP) and the elastomeric propylene copolymer (E) are defined more precisely.

The random propylene copolymer (R-PP) comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the random propylene copolymer (R-PP) according to this invention comprises, especially consists of, monomers copolymerizable with propylene from the group consisting of ethylene, 1-butene and 1-hexene. More specifically the random propylene copolymer (R-PP) of this invention comprises—apart from propylene—units derivable from ethylene and/or 1-butene. In a preferred embodiment the random propylene copolymer (R-PP) comprises units derivable from ethylene and propylene only.

The comonomer content of the random propylene copolymer (R-PP) is not more than 7.0 wt.-%, more preferably not more than 6.0 wt.-%, still more preferably in the range of 1.0 to 7.0 wt.-%, yet more preferably in the range of 1.5 to 6.0 wt.-%, still more preferably in the range of 1.5 to 5.5 wt.-%, like in the range of 2.0 to below 5.0 wt.-%.

Further it is appreciated that the propylene copolymer fulfills inequation (III), more preferably inequation (IIIa), yet more preferably inequation (Mb), still more preferably inequation (IIIc), still yet more preferably inequation (IIId), $$\frac{Co(\text{total})}{Co(RPP)} \geq 1.3, \quad \text{(III)}$$

$$\frac{Co(\text{total})}{Co(RPP)} \geq 1.4, \quad \text{(IIIa)}$$

$$4.0 \geq \frac{Co(\text{total})}{Co(RPP)} \geq 1.3, \quad \text{(IIIb)}$$

$$3.5 \geq \frac{Co(\text{total})}{Co(RPP)} \geq 1.4, \quad \text{(IIIc)}$$

$$3.0 \geq \frac{Co(\text{total})}{Co(RPP)} \geq 1.4, \quad \text{(IIId)}$$

wherein
Co (total) is the comonomer content [wt.-%] of the propylene copolymer,
Co (RPP) is the comonomer content [wt.-%] of the random propylene copolymer (R-PP).

The term "random" indicates that the comonomers of the random propylene copolymer (R-PP), as well as of the first propylene copolymer fraction (R-PP1) and the second propylene copolymer fraction (R-PP2) are randomly distributed within the propylene copolymers. The term random is understood according to IUPAC (Glossary of basic terms in polymer science; IUPAC recommendations 1996).

The comonomer content of the matrix (M), i.e. of the random propylene copolymer (R-PP), has also impact on the amount of xylene cold solubles in the matrix (M). Thus it is preferred that the amount of the xylene cold soluble (XCS) fraction of the matrix (M), i.e. of the random propylene copolymer (R-PP), is equal or below 20.0 wt.-%, more preferably is in the range of 8.0 to equal or below 20.0 wt.-%, like in the range of 10.0 to 18.0 wt.-%.

The random propylene copolymer (R-PP) preferably has a melt flow rate MFR$_2$ (230° C.) in the range of more than 0.5 to equal or below 3.0 g/10 min, like in the range of more than 0.5 to below 3.0 g/10 min, more preferably in the range of more than 0.5 to 2.5 g/10 min, still more preferably in the range of 0.6 to 1.7 g/10 min, like in the range of 0.7 to below 1.5 g/10 min.

The random propylene copolymer (R-PP) preferably comprises at least two polymer fractions, like two or three polymer fraction, all of them are propylene copolymers. Preferably the random propylene copolymer (R-PP) comprises at least two different random propylene copolymer fractions, like two different random propylene copolymer fractions, wherein further the two random propylene copolymer fractions differ in the comonomer content and/or in the melt flow rate MFR$_2$ (230° C.), preferably differ in the comonomer content and in the melt flow rate MFR$_2$ (230° C.).

Preferably one fraction of the two random polymer copolymer fractions of the random propylene copolymer (R-PP) is the commoner lean fraction and the other fraction is the comonomer rich fraction, wherein further the lean fraction and the rich fraction fulfils inequation (IV), more preferably inequation (IVa), still more preferably inequation (IVb), $$\frac{Co(\text{lean})}{Co(\text{rich})} \leq 055, \quad (\text{IV})$$

$$0.10 \leq \frac{Co(\text{lean})}{Co(\text{rich})} \leq 0.50, \quad (\text{IVa})$$

$$0.15 \leq \frac{Co(\text{lean})}{Co(\text{rich})} \leq 0.45 \quad (\text{IVb})$$

wherein
Co (lean) is the comonomer content [wt.-%] of the random propylene copolymer fraction with the lower comonomer content,
Co (rich) is the comonomer content [wt.-%] of the random propylene copolymer fraction with the higher comonomer content.

In addition or alternatively to inequation (IV) one fraction of the two random polymer copolymer fractions of the random propylene copolymer (R-PP is the low melt flow rate MFR$_2$ (230° C.) fraction and the other fraction is the high melt flow rate MFR$_2$ (230° C.) fraction, wherein further the low flow fraction and the high flow fraction fulfils inequation (V), more preferably inequation (Va), still more preferably inequation (Vb), $$\frac{MRF(\text{high})}{MFR(\text{low})} \geq 1.80 \quad (\text{V})$$

$$15.0 \geq \frac{MFR(\text{high})}{MFR(\text{low})} \geq 2.50 \quad (\text{Va})$$

$$12.0 \geq \frac{MFR(\text{high})}{MFR(\text{low})} \geq 4.50 \quad (\text{Vb})$$

wherein
MFR (high) is the melt flow rate MFR$_2$ (230° C.) [g/10 min] of the random propylene copolymer fraction with the higher melt flow rate MFR$_2$ (230° C.),
MFR (low) is the melt flow rate MFR$_2$ (230° C.) [g/10 min] of the random propylene copolymer fraction with the lower melt flow rate MFR$_2$ (230° C.).

Even more preferred the random propylene copolymer (R-PP) comprises, preferably consists of, a first propylene copolymer fraction (R-PP1) and a second propylene copolymer fraction (R-PP2), wherein further the first propylene copolymer fraction (R-PP1) and the second propylene copolymer fraction (R-PP2) differ in the comonomer content and/or in the melt flow rate MFR$_2$ (230° C.), preferably differ in the comonomer content and in the melt flow rate MFR$_2$ (230° C.).

Thus in one embodiment the first random propylene copolymer fraction (R-PP1) has a higher comonomer content and melt flow rate MFR$_2$ (230° C.) than the second random propylene copolymer fraction (R-PP2).

In another embodiment the second random propylene copolymer fraction (R-PP2) has a higher comonomer content and melt flow rate MFR$_2$ (230° C.) than the first random propylene copolymer fraction (R-PP1).

In still another embodiment the first random propylene copolymer fraction (R-PP1) has a higher comonomer content but a lower melt flow rate MFR$_2$ (230° C.) than the second random propylene copolymer fraction (R-PP2);

In further embodiment the second random propylene copolymer fraction (R-PP2) has a higher comonomer content but a lower melt flow rate MFR$_2$ (230° C.) than the first random propylene copolymer fraction (R-PP1).

Thus it is especially preferred that the first random propylene copolymer fraction (R-PP1) and the second random propylene copolymer fraction (R-PP2) fulfill together the inequation (VI), more preferably inequation (VIa), still more preferably inequation (VIb), $$\frac{Co(R-PP1)}{Co(R-PP2)} \leq 0.55, \quad (\text{VI})$$

$$0.10 \leq \frac{Co(R-PP1)}{Co(R-PP2)} \leq 0.50, \quad (\text{VIa})$$

$$0.15 \leq \frac{Co(R-PP1)}{Co(R-PP2)} \leq 0.45 \quad (\text{VIb})$$

wherein
Co (R-PP1) is the comonomer content [wt.-%] of the first random propylene copolymer fraction (R-PP1),
Co (R-PP2) is the comonomer content [wt.-%] of the second random propylene copolymer fraction (R-PP2).

In addition or alternatively to inequation (VI) the first random propylene copolymer fraction (R-PP1) and the second random propylene copolymer fraction (R-PP2) fulfill together the inequation (VII), more preferably inequation (VIIa), still more preferably inequation (VIIb), $$\frac{MFR(R-PP1)}{MFR(R-PP2)} \geq 1.80 \quad (\text{VII})$$

$$15.0 \geq \frac{MFR(R-PP1)}{MFR(R-PP2)} \geq 2.50 \quad (\text{VIIa})$$

$$12.0 \geq \frac{MFR(R-PP1)}{MFR(R-PP2)} \geq 4.50 \quad (\text{VIIb})$$

wherein
MFR (R-PP1) is the melt flow rate MFR$_2$ (230° C.) [g/10 min] of the first random propylene copolymer fraction (R-PP1), MFR (R-PP2) is the melt flow rate MFR$_2$ (230° C.) [g/10 min] of the second random propylene copolymer fraction (R-PP2).

In one specific embodiment the random propylene copolymer (R-PP) comprises, preferably consists of, the first random propylene copolymer fraction (R-PP1) and the second random propylene copolymer fraction (R-PP2), wherein further the random propylene copolymer (R-PP) fulfills
(a) the inequation (VIII), more preferably inequation (VIIIa), still more preferably inequation (VIIIb), $$\frac{Co(R-PP1)}{Co(R-PP)} \leq 0.65, \quad \text{(VIII)}$$

$$0.15 \leq \frac{Co(R-PP1)}{Co(R-PP)} \leq 0.60, \quad \text{(VIIIa)}$$

$$0.20 \leq \frac{Co(R-PP1)}{Co(R-PP)} \leq 0.55 \quad \text{(VIIIb)}$$

wherein
Co (R-PP1) is the comonomer content [wt.-%] of the first random propylene copolymer fraction (R-PP1),
Co (R-PP) is the comonomer content [wt.-%] of the random propylene copolymer fraction (R-PP).
and/or
(b) the inequation (IX), more preferably inequation (IXa), still more preferably inequation (IXb), $$\frac{MFR(R-PP1)}{MFR(R-PP)} \geq 0.50 \quad \text{(VII)}$$

$$10.0 \geq \frac{MFR(R-PP1)}{MFR(R-PP)} \geq 1.00 \quad \text{(VIIa)}$$

$$8.0 \geq \frac{MFR(R-PP1)}{MFR(R-PP)} \geq 1.50 \quad \text{(VIIb)}$$

wherein
MFR (R-PP1) is the melt flow rate MFR$_2$ (230° C.) [g/10 min] of the first random propylene copolymer fraction (R-PP1),
MFR (R-PP) is the melt flow rate MFR$_2$ (230° C.) [g/10 min] of the random propylene copolymer fraction (R-PP).

Thus it is preferred that the first random propylene copolymer fraction (R-PP1) has a comonomer content of equal or below 4.0 wt.-%, more preferably of equal or below 3.5 wt.-%, yet more preferably in the range 0.2 to 4.0 wt.-%, still more preferably in the range 0.5 to 3.5 wt.-%, like in the range of 1.0 to 3.0 wt.-%.

As the comonomer of the first random propylene copolymer fraction (R-PP1) preferably is rather low, also its xylene cold soluble (XCS) is comparably low. Thus it is preferred that the amount of the xylene cold soluble (XCS) fraction of the first random propylene copolymer fraction (R-PP1) is equal or below than 10.0 wt.-%, more preferably is in the range of 1.0 to 10.0 wt.-%, still more preferably is in the range of 2.0 to 9.0 wt.-%, yet more preferably is in the range of 2.5 to 8.0 wt.-%.

Preferably the first random propylene copolymer fraction (R-PP1) preferably has a melt flow rate MFR$_2$ (230° C.) in the range of in the range of 0.3 to 5.5 g/10 min, more preferably in the range 1.0 to 4.5 g/10 min.

On the other hand the second random propylene copolymer fraction (R-PP2) preferably has a comonomer content in the range of 1.0 to 12.0 wt.-%, still more preferably in the range 1.5 to 10.0 wt.-%, yet more preferably in the range 2.5 to 9.0 wt.-%.

The comonomers of the first random propylene copolymer fraction (R-PP1) and second random propylene copolymer fraction (R-PP2), respectively, copolymerizable with propylene are ethylene and/or C$_4$ to C$_{12}$ α-olefins, in particular ethylene and/or C$_4$ to C$_8$ α-olefins, e.g. 1-butene and/or 1-hexene. Preferably the first random propylene copolymer fraction (R-PP1) and second random propylene copolymer fraction (R-PP2), respectively, comprise, especially consist of, monomers copolymerizable with propylene from the group consisting of ethylene, 1-butene and 1-hexene. More specifically the first random propylene copolymer fraction (R-PP1) and second random propylene copolymer fraction (R-PP2), respectively, comprise—apart from propylene—units derivable from ethylene and/or 1-butene. In a preferred embodiment the first random propylene copolymer fraction (R-PP1) and the second random propylene copolymer fraction (R-PP2) comprise the same comonomers, i.e. ethylene only.

Preferably the second random propylene copolymer fraction (R-PP2) preferably has a melt flow rate MFR$_2$ (230° C.) in the range of in the range of 0.1 to 5.5 g/10 min, more preferably in the range 0.3 to 4.5 g/10 min.

Preferably the weight ratio between the first random propylene copolymer fraction (R-PP1) and the second random propylene copolymer fraction (R-PP2) is 20/80 to 80/20, more preferably 30/70 to 70/30, like 40/60 to 60/40.

As mentioned above a further component of the heterophasic propylene copolymer (RAHECO) is the elastomeric propylene copolymer (E) dispersed in the matrix (M), i.e. in the random propylene copolymer (R-PP). Concerning the comonomers used in the elastomeric propylene copolymer (E) it is referred to the information provided for the heterophasic propylene copolymer (RAHECO) and the random propylene copolymer (R-PP), respectively. Accordingly the elastomeric propylene copolymer (E) comprises monomers copolymerizable with propylene, for example comonomers such as ethylene and/or C$_4$ to C$_{12}$ α-olefins, in particular ethylene and/or C$_4$ to C$_8$ α-olefins, e.g. 1-butene and/or 1-hexene. Preferably the elastomeric propylene copolymer (E) comprises, especially consists of, monomers copolymerizable with propylene from the group consisting of ethylene, 1-butene and 1-hexene. More specifically the elastomeric propylene copolymer (E) comprises—apart from propylene—units derivable from ethylene and/or 1-butene. Thus in an especially preferred embodiment the elastomeric propylene copolymer (E) comprises units derivable from ethylene and propylene only. It is especially preferred that the random propylene copolymer (R-PP) and the elastomeric propylene copolymer (E) comprises the same comonomers. Accordingly in one specific embodiment the random propylene copolymer (R-PP) and the elastomeric propylene copolymer (E) comprise propylene and ethylene only.

The comonomer content of the elastomeric propylene copolymer (E) preferably is not more than 25.0 wt.-%, still more preferably in the range of 12.0 to 25.0 wt.-%, yet more preferably in the range of more than 14.0 to 22.0 wt.-%, even more preferably in the range of more than 15.0 to 20.0 wt.-%.

The propylene copolymer, i.e. the heterophasic propylene copolymer (RAHECO), as defined in the instant invention may contain up to 5.0 wt.-% additives, like α-nucleating agents and antioxidants, as well as slip agents and antiblocking agents. Preferably the additive content is below 3.0 wt.-%, like below 1.0 wt.-%

Preferably the propylene copolymer, i.e. the heterophasic propylene copolymer (RAHECO), comprises an α-nucleating agent. Even more preferred the present invention is free of β-nucleating agents. Accordingly, the α-nucleating agent is preferably selected from the group consisting of
(i) salts of monocarboxylic acids and polycarboxylic acids, e.g. sodium benzoate or aluminum tert-butylbenzoate, and
(ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and
(iii) salts of diesters of phosphoric acid, e.g. sodium 2,2'-methylenebis(4,6,-di-tert-butylphenyl)phosphate or aluminium-hydroxy-bis[2,2'-methylene-bis(4,6-di-t-butylphenyl)phosphate], and
(iv) vinylcycloalkane polymer and vinylalkane polymer (as discussed in more detail below), and
(v) mixtures thereof.

Such additives are generally commercially available and are described, for example, in "Plastic Additives Handbook", 5th edition, 2001 of Hans Zweifel.

Preferably the propylene copolymer, i.e. the heterophasic propylene copolymer (RAHECO), contains up to 5 wt.-% of the α-nucleating agent. In a preferred embodiment, the propylene copolymer, i.e. the heterophasic propylene copolymer (RAHECO), contains not more than 200 ppm, more preferably of 1 to 200 ppm, more preferably of 5 to 100 ppm of a α-nucleating agent, in particular selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, vinylcycloalkane polymer, vinylalkane polymer, and mixtures thereof.

It is especially preferred the propylene copolymer, i.e. the heterophasic propylene copolymer (RAHECO), contains a vinylcycloalkane, like vinylcyclohexane (VCH), polymer and/or vinylalkane polymer. In one specific embodiment the propylene copolymer, i.e. the heterophasic propylene copolymer (RAHECO), contains a vinylcycloalkane, like vinylcyclohexane (VCH), polymer and/or vinylalkane polymer. Preferably the vinylcycloalkane is vinylcyclohexane (VCH) polymer is introduced into the propylene copolymer, i.e. the heterophasic propylene copolymer (RAHECO), by the BNT technology.

The present invention is not only directed to the instant propylene copolymer, i.e. the heterophasic propylene copolymer (RAHECO), but also to molded articles, preferably blow molded article (extrusion blow molded, injection blow molded or injection stretch blow molded), like extrusion blow molded article, e.g. bottles, like extrusion blow molded bottles, made therefrom. Accordingly in a further embodiment the present invention is directed to a molded articles, like a molded bottle, preferably to a blow molded article, more preferably to extrusion blow molded article, like extrusion blow molded bottle, comprising at least 70 wt.-%, preferably comprising at least 80 wt.-%, more preferably comprising at least 90 wt.-%, still more preferably comprising at least 95 wt.-%, yet more preferably comprising at least 99 wt.-%, of the instant propylene copolymer, i.e. the heterophasic propylene copolymer (RAHECO). In one preferred embodiment the molded articles, like a molded bottle, preferably the blow molded article, more preferably the extrusion blow molded article, like extrusion blow molded bottle, consists of the propylene copolymer, i.e. consists of the heterophasic propylene copolymer (RAHECO). In one specific embodiment the blow molded article is a blow molded bottle, like an extrusion blow molded bottle.

The applied processes for the manufacture of moulded articles are within the knowledge of the skilled person. Reference is made polypropylene handbook, Nello Pasquini, $2^{rd}$ edition, Hanser. For instance, in the extrusion blow molding (EBM) process a polymer melt is first extruded through a tubular die into air forming a polymer tube, subsequently blowing up said polymer tube (typically called "parison" in this technical field) until the outside of the tube reaches the boundaries of the mold. To cover the wall of the mold fully with the blown up polymer tube is rather difficult compared to injection molding because the air between polymer tube and mold has to be removed totally which is a demanding process step. Further the inside of the polymer tube is not in contact with the mold and therefore there is only little possibility to influence the inner surface structure of the tube. As a consequence thereof extrusion blown molded articles, like bottles, normally show inferior optical properties compared to any injection molded articles. For instance, the surface property inside and/or outside of extrusion blown bottles is typically non-uniform (flow lines, melt fracture) leading to lower overall gloss and transparency compared to injection molded bottles or injection stretched blown molded articles (ISBM).

Typically the molded articles (bottles), preferably to a blow molded articles (bottles), more preferably to extrusion blow molded articles (bottles), have a wall thickness in the range of 0.1 to 1.0 mm.

The instant propylene copolymer, i.e. the heterophasic propylene copolymer (RAHECO), is preferably obtained by a specific process. Accordingly the instant propylene copolymer, i.e. the heterophasic propylene copolymer (RAHECO), is preferably obtained by a sequential polymerization process comprising the steps of
(a) polymerizing in a first reactor (R1)
propylene and
ethylene and/or a C4 to C12 α-olefin, preferably ethylene, obtaining a first polymer fraction, i.e. a first random propylene copolymer fraction (R-PP1),
(b) transferring the first polymer fraction, i.e. the first random propylene copolymer fraction (R-PP1), into a second reactor (R2),
(c) polymerizing in said second reactor (R2) in the presence of the first polymer fraction, i.e. of the first random propylene copolymer fraction (R-PP1), propylene and ethylene and/or a C4 to C12 α-olefin, preferably ethylene, obtaining a second polymer fraction, i.e. a second random propylene copolymer fraction (R-PP2), the first and second polymer fraction form the random propylene copolymer (R-PP),
(d) transferring said random propylene copolymer (R-PP), into a third reactor (R3),
(e) polymerizing in said third reactor (R3) in the presence of the random propylene copolymer (R-PP),
propylene and
ethylene and/or a C4 to C12 α-olefin, preferably ethylene, obtaining a third polymer fraction, said third polymer fraction is the elastomeric propylene copolymer (E); the third polymer fraction and the random propylene copolymer (R-PP), form the propylene copolymer, i.e. the heterophasic propylene copolymer (RAHECO), and (f) removing the propylene copolymer from the third reactor (R3).

Preferably between the second reactor (R2), and the third reactor (R3) the monomers are flashed out.

The term "sequential polymerization process" indicates that the propylene copolymer, i.e. the heterophasic propylene copolymer (RAHECO), is produced in at least four reactors, preferably in four reactors, connected in series. Accordingly the present process comprises at least a first reactor (R1), a second reactor (R2), and a third reactor (R3). The term "polymerization reactor" shall indicate that the main polymerization takes place. Thus in case the process consists of three polymerization reactors, this definition does not exclude the option that the overall process comprises for instance a pre-polymerization step in a pre-polymerization reactor. The term "consist of" is only a closing formulation in view of the main polymerization reactors.

As stated above in the first two reactors the matrix (M), i.e. the random propylene copolymer (R-PP) is produced. More precisely, in the first reactor (R1) the first random propylene copolymer fraction (R-PP1) is produced whereas in the second reactor (R2) the second random propylene copolymer fraction (R-PP2).

The preferred comonomers used in the first reactor (R1) are the same as indicated above, for the first random propylene copolymer fraction (R-PP1). Accordingly especially preferred comonomers are ethylene, 1-butene and 1-hexene. In one specific embodiment the comonomer is ethylene.

Preferably the weight ratio between the first random propylene copolymer fraction (R-PP1) and the second random propylene copolymer fraction (R-PP2) is 20/80 to 80/20, more preferably 30/70 to 70/30, yet more preferably 40/60 to 60/40.

Accordingly in the first reactor (R1) a first random propylene copolymer fraction (R-PP1) is produced whereas in the second rector (R2) the second random propylene copolymer fraction (R-PP2) is produced obtaining thereby the random propylene copolymer (R-PP). Concerning the individual properties reference is made to the information provided above.

The comonomers of the random propylene copolymer (R-PP), of the first random propylene copolymer fraction (R-PP1), and of the second random propylene copolymer fraction (R-PP2) copolymerizable with propylene are ethylene and/or $C_4$ to $C_{12}$ α-olefins, in particular ethylene and/or $C_4$ to $C_8$ α-olefins, e.g. 1-butene and/or 1-hexene. Preferably the random propylene copolymer (R-PP), the first random propylene copolymer fraction (R-PP1), and the second random propylene copolymer fraction (R-PP2) comprise, especially consist of, monomers copolymerizable with propylene from the group consisting of ethylene, 1-butene and 1-hexene. More specifically the random propylene copolymer (R-PP), the first random propylene copolymer fraction (R-PP1) and the second random propylene copolymer fraction (R-PP2) comprise—apart from propylene—units derivable from ethylene and/or 1-butene. In a preferred embodiment the random propylene copolymer (R-PP), the first random propylene copolymer fraction (R-PP1) and the second random propylene copolymer fraction (R-PP2) comprise the same comonomers, i.e. ethylene only.

Further the first random propylene copolymer fraction (R-PP1), i.e. the polymer of the first reactor (R1), has preferably a xylene cold soluble (XCS) fraction of equal or below than 10.0 wt.-%, more preferably in the range of 1.0 to 10.0 wt.-%, still more preferably in the range of 2.0 to 9.0 wt.-%, yet more preferably in the range of 2.5 to 8.0 wt.-%.

On the other hand the second random propylene copolymer fraction (R-PP2), i.e. the polymer produced in the second reactor (R2), preferably has a xylene cold soluble (XCS) fraction of equal or less than 40 wt.-%, more preferably in the range of 2 to 35 wt.-%, still more preferably in the range of 3 to 30 wt.-%.

Accordingly the overall xylene cold soluble (XCS) content in the second reactor, i.e. the xylene cold soluble (XCS) fraction of the random propylene copolymer (R-PP), preferably equal or below than 20.0 wt.-%, more preferably is in the range of 8.0 to equal or below 20.0 wt.-%, still more preferably is in the range of 10.0 to 18.0 wt.-%.

After the second reactor (R2) the matrix (M), i.e. the random propylene copolymer (R-PP), of the propylene copolymer, i.e. the heterophasic propylene copolymer (RAHECO), is obtained. This matrix (M) is subsequently transferred into the third reactor (R3) in which the elastomeric propylene copolymer (E) is produced (step (e)) and thus the propylene copolymer, i.e. the heterophasic propylene copolymer (RAHECO), of the instant invention is obtained.

Concerning the individual properties of the elastomeric propylene copolymer (E) and the propylene copolymer, i.e. the heterophasic propylene copolymer (RAHECO), reference is made to the information provided above.

Preferably the weight ratio between the matrix (M), i.e. the random propylene copolymer (R-PP), after step (c) and the elastomeric propylene copolymer (E) produced in the step (e) is 60/40 to 90/10, more preferably 70/30 to 85/15.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer.

According to the present invention the slurry reactor (SR) is preferably a (bulk) loop reactor (LR).

The second reactor (R2), and the third reactor (R3) are preferably gas phase reactors (GPR). Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor (R1) is a slurry reactor (SR), like loop reactor (LR), whereas the second reactor (R2), and third reactor (R3) are gas phase reactors (GPR). Accordingly for the instant process at least three, preferably three polymerization reactors, namely a slurry reactor (SR), like loop reactor (LR), a first gas phase reactor (GPR-1), and a second gas phase reactor (GPR-2) connected in series are used. If needed prior to the slurry reactor (SR) a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the propylene copolymer, i.e. the heterophasic propylene copolymer (RAHECO), as defined above the conditions for the first reactor (R1), i.e. the slurry reactor (SR), like a loop reactor (LR), of step (a) may be as follows:

the temperature is within the range of 40° C. to 110° C., preferably between 60° C. and 100° C., like 68 to 95° C., the pressure is within the range of 20 bar to 80 bar, preferably between 40 bar to 70 bar, hydrogen can be added for controlling the molar mass in a manner known per se.

Subsequently, the reaction mixture from step (a) is transferred to the second reactor (R2), i.e. gas phase reactor (GPR-1), i.e. to step (c), whereby the conditions in step (c) are preferably as follows:

the temperature is within the range of 50° C. to 130° C., preferably between 60° C. and 100° C., the pressure is within the range of 5 bar to 50 bar, preferably between 15 bar to 35 bar, hydrogen can be added for controlling the molar mass in a manner known per se.

The condition in the third reactor (R3), preferably in the second gas phase reactor (GPR-2), is similar to the second reactor (R2).

The residence time can vary in the three reactor zones.

In one embodiment of the process for producing the propylene copolymer, i.e. the heterophasic propylene copolymer (RAHECO), the residence time the first reactor (R1), i.e. the slurry reactor (SR), like a loop reactor (LR), is in the range 0.2 to 4 hours, e.g. 0.3 to 1.5 hours and the residence time in the gas phase reactors will generally be 0.2 to 6.0 hours, like 0.5 to 4.0 hours.

If desired, the polymerization may be effected in a known manner under supercritical conditions in the first reactor (R1), i.e. in the slurry reactor (SR), like in the loop reactor (LR), and/or as a condensed mode in the gas phase reactors (GPR).

Preferably the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 0 to 50° C., preferably from 10 to 45° C., and more preferably from 15 to 40° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the propylene copolymer, i.e. the heterophasic propylene copolymer (RAHECO), is obtained by a sequential polymerization process, as described above, in the presence of a catalyst system comprising a Ziegler-Natta catalyst and optionally an external donor, preferably a catalyst system comprising three components, namely as component (i) a Ziegler-Natta procatalyst, and optionally as component (ii) an organometallic cocatalyst and as component (iii) an external donor represented by formula (IIIa) or (Iamb), preferably represented by formula (IIIa).

The process runs especially efficient by using a Ziegler-Natta catalyst system, preferably by using a Ziegler-Natta catalyst system as defined herein detail below, and a specific comonomer/propylene ratio in the second reactor (R2) and/or in the third (R3) and forth reactor (R4), respectively. Accordingly it is preferred that (a) the comonomer/propylene ratio [Co/C3], like the ethylene/propylene ratio [C2/C3], in the first reactor (R1), i.e. in step (a), is in the range of 1 to 15 mol/kmol, more preferably in the range of 2 to 8 mol/kmol, and/or (b) the comonomer/propylene ratio [Co/C3], like the ethylene/propylene ratio [C2/C3], in the second reactor (R2), i.e. in step (c), is in the range of 10 to 65 mol/kmol, more preferably in the range of 20 to 60 mol/kmol, and/or (c) the comonomer/propylene ratio [Co/C3], like the ethylene/propylene ratio [C2/C3], in the third reactor (R3), i.e. in step (e), is in the range of above 120 to 200 mol/kmol, more preferably in the range of 130 to 180 mol/kmol.

In the following the used catalyst is defined in more detail.

Preferably component (i) is a Ziegler-Natta procatalyst which contains a transesterification product of a lower alcohol and a phthalic ester.

The procatalyst used according to the invention is prepared by a) reacting a spray crystallized or emulsion solidified adduct of $MgCl_2$ and a $C_1$-$C_2$ alcohol with $TiCl_4$ b) reacting the product of stage a) with a dialkylphthalate of formula (I)

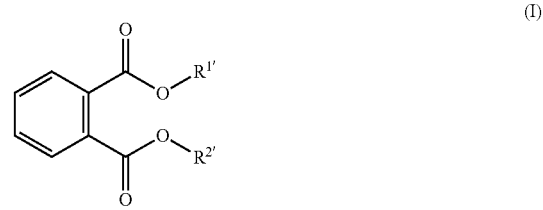

(I)

wherein $R^{1'}$ and $R^{2'}$ are independently at least a $C_5$ alkyl under conditions where a transesterification between said $C_1$ to $C_2$ alcohol and said dialkylphthalate of formula (I) takes place to form the internal donor c) washing the product of stage b) or d) optionally reacting the product of step c) with additional $TiCl_4$.

The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2*nROH$, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula MgCl$_2$*nROH, wherein R is methyl or ethyl, preferably ethyl, and n is 1 to 6, is contacting with TiCl$_4$ to form a titanised carrier, followed by the steps of adding to said titanised carrier
(i) a dialkylphthalate of formula (I) with R$^{1'}$ and R$^{2'}$ being independently at least a C$_5$-alkyl, like at least a C$_8$-alkyl,
or preferably
(ii) a dialkylphthalate of formula (I) with R$^{1'}$ and R$^{2'}$ being the same and being at least a C$_5$-alkyl, like at least a C$_8$-alkyl,
or more preferably
(iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate,
to form a first product,
subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol-%, of a dialkylphthalate of formula (II)

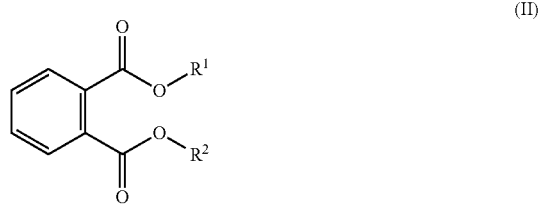

(II)

with R$^1$ and R$^2$ being methyl or ethyl, preferably ethyl, the dialkylphthalat of formula (II) being the internal donor and
recovering said transesterification product as the procatalyst composition (component (i)).

The adduct of the formula MgCl$_2$*nROH, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt.-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

Still more preferably the catalyst used according to the invention is the catalyst as described in the example section; especially with the use of dioctylphthalate as dialkylphthalate of formula (I).

For the production of the propylene copolymer, i.e. the heterophasic propylene copolymer (RAHECO), according to the invention the catalyst system used preferably comprises in addition to the special Ziegler-Natta procatalyst an organometallic cocatalyst as component (ii).

Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (IIIa) or (Iamb). Formula (IIIa) is defined by Si(OCH$_3$)$_2$R$_2^5$ (IIIa)

wherein R$^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that R$^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

Formula (Iamb) is defined by

Si(OCH$_2$CH$_3$)$_3$(NR$^x$R$^y$) (Iamb)

wherein R$^x$ and R$^y$ can be the same or different a represent a hydrocarbon group having 1 to 12 carbon atoms.

R$^x$ and R$^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that R$^x$ and R$^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both R$^x$ and R$^y$ are the same, yet more preferably both R$^x$ and R$^y$ are an ethyl group.

More preferably the external donor of formula (Iamb) is diethylaminotriethoxysilane.

More preferably the external donor is selected from the group consisting of diethylaminotriethoxysilane [Si(OCH$_2$CH$_3$)$_3$(N(CH$_2$CH$_3$)$_2$)], dicyclopentyl dimethoxy silane [Si(OCH$_3$)$_2$(cyclo-pentyl)$_2$], diisopropyl dimethoxy silane [Si(OCH$_3$)$_2$(CH(CH$_3$)$_2$)$_2$] and mixtures thereof. Most preferably the external donor is dicyclopentyl dimethoxy silane [Si(OCH$_3$)$_2$(cyclo-pentyl)$_2$].

If desired the Ziegler-Natta procatalyst is modified by polymerizing a vinyl compound in the presence of the catalyst system, comprising the special Ziegler-Natta procatalyst (component (i)), the external donor (component (iii)) and optionally the cocatalyst (component (ii)), wherein the vinyl compound has the formula:

$$CH_2=CH—CHR^3R^4$$

wherein $R^3$ and $R^4$ together form a 5- or 6-membered saturated, unsaturated or aromatic ring or independently represent an alkyl group comprising 1 to 4 carbon atoms. The so modified catalyst is used for the preparation of the propylene copolymer, i.e. of the heterophasic propylene copolymer (RAHECO), according to this invention.

The additives as stated above are added to the propylene copolymer, i.e. to the heterophasic propylene copolymer (RAHECO) preferably by extruding. For mixing/extruding, a conventional compounding or blending apparatus, e.g. a Banbury mixer, a 2-roll rubber mill, Buss-co-kneader or a twin screw extruder may be used. The polymer materials recovered from the extruder are usually in the form of pellets. These pellets are then further processed, e.g. by a (blow) mold forming process as described above.

In the following the present invention is further illustrated by means of examples.

EXAMPLES

1. Measuring Methods

The following definitions of terms and determination methods apply for the above general description of the invention as well as to the below examples unless otherwise defined.

Calculation of comonomer content of the second propylene copolymer fraction (R-PP2):

$$\frac{C(PP) - w(PP1) \times C(PP1)}{w(PP2)} = C(PP2) \quad (I)$$

wherein
w(PP1) is the weight fraction [in wt.-%] of the first random propylene copolymer fraction (R-PP1),
w(PP2) is the weight fraction [in wt.-%] of second propylene copolymer fraction (R-PP2),
C(PP1) is the comonomer content [in wt.-%] of the first random propylene copolymer fraction (R-PP1),
C(PP) is the comonomer content [in wt.-%] of the random propylene copolymer (R-PP),
C(PP2) is the calculated comonomer content [in wt.-%] of the second random propylene copolymer fraction (R-PP2).

Calculation of the xylene cold soluble (XCS) content of the second propylene copolymer fraction (R-PP2):

$$\frac{XS(PP) - w(PP1) \times XS(PP1)}{w(PP2)} = XS(PP2) \quad (II)$$

wherein
w(PP1) is the weight fraction [in wt.-%] of the first random propylene copolymer fraction (R-PP1),
w(PP2) is the weight fraction [in wt.-%] of second random propylene copolymer fraction (R-PP2),
XS(PP1) is the xylene cold soluble (XCS) content [in wt.-%] of the first random propylene copolymer fraction (R-PP1),
XS(PP) is the xylene cold soluble (XCS) content [in wt.-%] of the random propylene copolymer (R-PP),
XS(PP2) is the calculated xylene cold soluble (XCS) content [in wt.-%] of the second random propylene copolymer fraction (R-PP2).

Calculation of melt flow rate $MFR_2$ (230° C.) of the second propylene copolymer fraction (R-PP2):

$$MFR(PP2) = 10^{\left[\frac{log(MFR(PP))-w(PP1)\times log(MFR(PP1))}{w(PP2)}\right]} \quad (III)$$

wherein
w(PP1) is the weight fraction [in wt.-%] of the first random propylene copolymer fraction (R-PP1),
w(PP2) is the weight fraction [in wt.-%] of second random propylene copolymer fraction (R-PP2),
MFR(PP1) is the melt flow rate $MFR_2$ (230° C.) [in g/10 min] of the first random propylene copolymer fraction (R-PP1),
MFR(PP) is the melt flow rate $MFR_2$ (230° C.) [in g/10 min] of the random propylene copolymer (R-PP),
MFR(PP2) is the calculated melt flow rate $MFR_2$ (230° C.) [in g/10 min] of the second random propylene copolymer fraction (R-PP2).

Calculation of comonomer content of the elastomeric propylene copolymer (E), respectively:

$$\frac{C(RAHECO) - w(PP) \times C(PP)}{w(E)} = C(E) \quad (IV)$$

wherein
w(PP) is the weight fraction [in wt.-%] of the random propylene copolymer (R-PP), i.e. polymer produced in the first and second reactor (R1+R2),
w(E) is the weight fraction [in wt.-%] of the elastomeric propylene copolymer (E), i.e. polymer produced in the third reactor (R3)
C(PP) is the comonomer content [in wt.-%] of the random propylene copolymer (R-PP), i.e. comonomer content [in wt.-%] of the polymer produced in the first and second reactor (R1+R2),
C(RAHECO) is the comonomer content [in wt.-%] of the propylene copolymer, i.e. is the comonomer content [in wt.-%] of the polymer obtained after polymerization in the third reactor (R4),
C(E) is the calculated comonomer content [in wt.-%] of elastomeric propylene copolymer (E), i.e. of the polymer produced in the third reactor (R3).

$MFR_2$ (230° C.) is measured according to ISO 1133 (230° C., 2.16 kg load).

Comonomer content, especially ethylene content is measured with Fourier transform infrared spectroscopy (FTIR) calibrated with $^{13}$C-NMR. When measuring the ethylene content in polypropylene, a thin film of the sample (thickness about 250 μm) was prepared by hot-pressing. The area of absorption peaks 720 and 733 cm$^{-1}$ for propylene-ethylene-copolymers was measured with Perkin Elmer FTIR 1600 spectrometer. Propylene-1-butene-copolymers were evaluated at 767 cm$^{-1}$. The method was calibrated by ethylene content data measured by $^{13}$C-NMR. See also "IR-Spektroskopie für Anwender"; WILEY-VCH, 1997 and "Validierung in der Analytik", WILEY-VCH, 1997

Intrinsic viscosity is measured according to DIN ISO 1628/1, October 1999 (in Decalin at 135° C.).

The xylene solubles (XCS, wt.-%): Content of xylene cold solubles (XCS) is determined at 25° C. according ISO 16152; first edition; 2005 Jul. 1

Hexane soluble (C6-solubles, wt.-%): Content of hexane soluble is measured according to European Pharmacopoeia 6.0, EP316

10 g of a sample taken from 0.3 mm thick bottles was put into a 300 ml Erlenmeyer flask and 100 ml of n-hexane was added. The mixture was boiled under stirring in a reflux condenser for 4 h. The hot solution was cooled down under stirring for 45 min and filtered under vacuum (G4 glasfilter) and the filtrate is put into a round shenk (dried in a vacuum oven at 90° C. and weighted with 0.0001 g exactly). Then the hexane was evaporated under a nitrogen stream on a rotary evaporator. The round shenk was dried in a vacuum oven at 90° C. over night and was put into a desiccator for at least 2 hours to cool down. The shenk was weighted again and the hexane soluble was calculated therefrom.

Number Average Molecular Weight ($M_n$), Weight Average Molecular Weight ($M_w$) and Polydispersity (Mw/Mn) are determined by Gel Permeation Chromatography (GPC) according to the following method:

The weight average molecular weight Mw and the polydispersity (Mw/Mn), wherein Mn is the number average molecular weight and Mw is the weight average molecular weight) is measured by a method based on ISO 16014-1: 2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methylphenol) as solvent at 145° C. and at a constant flow rate of 1 mL/min. 216.5 µL of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

Melting temperature ($T_m$) and heat of fusion ($H_f$), crystallization temperature ($T_c$) and heat of crystallization ($H_c$): measured with Mettler TA820 differential scanning calorimetry (DSC) on 5 to 10 mg samples. DSC is run according to ISO 3146/part 3/method C2 in a heat/cool/heat cycle with a scan rate of 10° C./min in the temperature range of +23 to +210° C. Crystallization temperature and heat of crystallization ($H_c$) are determined from the cooling step, while melting temperature and heat of fusion ($H_f$) are determined from the second heating step Flexural Modulus: The flexural modulus was determined in 3-point-bending at 23° C. according to ISO 178 on 80×10×4 mm³ test bars injection moulded in line with EN ISO 1873-2

Description/Dimension of the Bottles 1 l bottles, having an outer diameter of 90 mm, wall thickness: 0.3 mm; overall-height of 204 mm, height of the cylindrical mantle of 185 mm Steam sterilization was performed in a Systec D series machine (Systec Inc., USA). The samples were heated up at a heating rate of 5° C./min starting from 23° C. After having been kept for 30 min at 121° C., they were removed immediately from the steam sterilizer and stored at room temperature till processed further.

Transparency, Clarity, and Haze Measurement on Bottles
Instrument: Haze-gard plus from BYK-Gardner
Testing: according to ASTM D1003 (as for injection molded plates)
Method: The measurement is done on the outer wall of the bottles. The top and bottom of the bottles are cut off. The resulting round wall is then split in two, horizontally. Then from this wall six equal samples of app. 60×60 mm are cut from close to the middle. The specimens are placed into the instrument with their convex side facing the haze port. Then the transparency, haze and clarity are measured for each of the six samples and the haze value is reported as the average of these six parallels.

Gloss Measurement on Bottles
Instrument: Sceen TRI-MICROGLOSS 20-60-80 from BYK-Gardner 20
Testing: ASTM D 2457 (as for injection molded plates)
The bottles: It is measured on the wall of the bottles. The top and bottom of the bottles is cut off. This round wall is then split in two, horizontally. Then this wall is cut into six equal samples of app. 90×90 mm, just to fit into a special light trap made for testing on injection molded parts. Then the gloss at 20° is measured on these six samples, and the average value is reported as gloss at 20°.

2. Examples

The catalyst used in the polymerization process for examples E1, E2, CE1 and CE2 has been produced as follows: First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP491566, EP591224 and EP586390. As co-catalyst triethyl-aluminium (TEAL) and as donor dicyclo pentyl dimethoxy silane (D-donor) was used The aluminium to donor ratio is indicated in table 1. Before the polymerization, the catalyst was prepolymerized with vinyl cyclohexane in an amount to achieve a concentration of 200 ppm poly(vinyl cyclohexane) (PVCH) in the final polymer. The respective process is described in EP 1 028 984 and EP 1 183 307. As additives 0.04 wt. % synthetic hydrotalcite (DHT-4A supplied by Kisuma Chemicals, Netherlands) and 0.15 wt % Irganox B 215 (1:2-blend of Irganox 1010 (Pentaerythrityl-tetrakis(3-(3',5'-di-tert.butyl-4-hydroxytoluyl)-propionate and tris(2,4-di-t-butylphenyl) phosphate) phosphite) of BASF AG, Germany were added to the polymers in the same step. For the production of 1 liter round bottles like used for testing in the inventive work a "Fischer Müller" Blow Molding Machine was used. The main processing parameters for the production are as follows:

Temperature profile: 180 to 200° C. applied in extruder, adapter and head
Melt temperature measured: 190 to 200° C.
Speed of extruder (revolution per minute; rpm): 13 to 16 rpm Die gap: the die gap was adjusted to get a bottle with a weight of 40 g with Borealis grade RB307MO (random propylene copolymer with a density of 902 kg/m³ and a MFR$_2$ of 1.5 g/10 min)

Cycle time: 12 to 16 seconds

TABLE 1

Polymerization conditions

| | | CE1 | CE2 | CE3 | E1 | E2 |
|---|---|---|---|---|---|---|
| TEAL/D | [mol/mol] | 15 | 15 | 15 | 15 | 15 |
| Loop | | | | | | |
| MFR$_2$ | [g/10 min] | 3.0 | 3.0 | 3.2 | 3.4 | 3.2 |
| C2 content | [wt.-%] | 1.9 | 2.0 | 1.9 | 2.0 | 2.2 |
| XCS | [wt.-%] | 4.1 | 4.1 | 4.3 | 3.8 | 3.9 |
| H$_2$/C3 ratio | [mol/kmol] | 2.98 | 2.95 | 2.99 | 2.99 | 3.00 |
| C2/C3 ratio | [mol/kmol] | 3.93 | 3.89 | 3.96 | 3.96 | 3.96 |
| 1 GPR | | | | | | |
| MFR$_2$ | [g/10 min] | 1.2 | 1.1 | 1.1 | 1.1 | 1.1 |
| C2 content | [wt.-%] | 4.4 | 4.3 | 4.6 | 5.1 | 4.9 |
| XCS | [wt.-%] | 14.8 | 14.6 | 15.8 | 15.8 | 16.2 |
| H$_2$/C3 ratio | [mol/kmol] | 5.6 | 5.5 | 5.6 | 5.2 | 5.4 |
| C2/C3 ratio | [mol/kmol] | 52.7 | 52.7 | 52.2 | 51.8 | 53.1 |
| 2 GPR | | | | | | |
| MFR$_2$ | [g/10 min] | 1.4 | 1.7 | 1.8 | 1.1 | 1.6 |
| C2 content | [wt.-%] | 10.8 | 9.6 | 9.8 | 9.0 | 8.9 |
| XCS | [wt.-%] | 36.8 | 33.6 | 32.9 | 32.8 | 32.8 |
| Tm | [° C.] | 151 | 150 | 150 | 150 | 150 |
| H$_2$/C3 ratio | [mol/kmol] | 374 | 700 | 1014 | 369 | 1011 |
| C2/C3 ratio | [mol/kmol] | 300 | 305 | 303 | 152 | 151 |
| Split | | | | | | |
| Loop | [wt.-%] | 33.4 | 34.2 | 35.2 | 34.3 | 34.5 |
| 1GPR | [wt.-%] | 40.8 | 43.6 | 44.8 | 45.5 | 45.7 |
| 2GPR | [wt.-%] | 25.8 | 22.2 | 20.0 | 20.2 | 19.8 |

TABLE 2

Properties

| | | CE1 | CE2 | CE3 | IE1 | IE2 |
|---|---|---|---|---|---|---|
| MFR$_2$ | [g/10 min] | 1.4 | 1.7 | 1.8 | 1.1 | 1.4 |
| C2 | [wt.-%] | 10.8 | 9.6 | 9.8 | 9.0 | 8.9 |
| XCS | [wt.-%] | 36.8 | 33.6 | 32.9 | 32.8 | 32.8 |
| Tm | [° C.] | 151 | 150 | 150 | 150 | 150 |
| C2 of XCS | [wt.-%] | 20.5 | 20.2 | 20.1 | 18.4 | 17.5 |
| IV of XCS | [dl/g] | 2.3 | 1.8 | 1.8 | 2.5 | 2.0 |
| Mw/Mn of XCS | [—] | 5.7 | 5.3 | 5.2 | 6.4 | 5.5 |
| C2 of XCI | [wt.-%] | 5.2 | 4.2 | 4.7 | 4.4 | 4.7 |
| Mw/Mn of XCI | [—] | 5.7 | 6.0 | 6.0 | 5.2 | 5.3 |
| Flex Modulus | [MPa] | 460 | 470 | 483 | 516 | 522 |
| C6-Solubles | [wt.-%] | 9.9 | 9.4 | 9.5 | 4.2 | 5.0 |

TABLE 3

Properties on bottles

| | | IE1 | IE2 | CE1 | CE2 | CE3 | CE4 |
|---|---|---|---|---|---|---|---|
| Transparency b.s. | [%] | 91 | 92 | 86 | 87 | 88 | 90 |
| Haze a.s. | [%] | 25 | 22 | 33 | 26 | 28 | 24 |
| Clarity b.s. | [%] | 67 | 71 | 66 | 72 | 72 | 89 |
| Gloss 20° b.s. | [%] | 7 | 10 | 6 | 10 | 10 | |
| BAF b.s. | [—] | 19 | 34 | 11 | 26 | 25 | |
| Transparency a.s. | [%] | 90 | 91 | 83 | 84 | 85 | 89 |
| Haze a.s | [%] | 26 | 30 | 37 | 30 | 30 | 33 |
| Clarity a.s | [%] | 66 | 63 | 63 | 71 | 68 | 86 |
| Gloss 20° a.s. | [%] | 8 | 8 | 5 | 10 | 10 | |
| BAF a.s | [—] | 20 | 16 | 9 | 22 | 22 | |

CE4 is the commercial LDPE Bormed LE6609-PH of Borealis AG

The invention claimed is:

1. A propylene copolymer having:
   (a) a melt flow rate MFR$_2$ (230° C.) measured according to ISO 1133 in the range of more than 0.8 to below 2.5 g/10 min,
   (b) a xylene cold soluble content (XCS) determined according to ISO 16152 (25° C.) in the range of 25.0 to 35.0 wt. % based on the propylene copolymer, and
   (c) a comonomer content in the range of more than 4.5 to 10.0 wt. % based on the propylene copolymer,
   wherein further:
   (d) the comonomer content of xylene cold soluble (XCS) fraction of the propylene copolymer is in the range of 12.0 to 22.0 wt. % based on the xylene cold soluble (XCS) fraction of the propylene copolymer, and
   (e) the intrinsic viscosity (IV) determined according to DIN ISO 1628/1 (in decalin at 135° C.) of the xylene cold soluble (XCS) fraction of the propylene copolymer is in the range of more than 1.5 to below 3.0 dl/g.

2. The propylene copolymer according to claim 1, wherein the xylene cold insoluble (XCI) fraction of the propylene copolymer has a polydispersity (Mw/Mn) of more than 4.9 to 10.0.

3. A propylene copolymer having:
   (a) a melt flow rate MFR$_2$ (230° C.) measured according to ISO 1133 in the range of more than 0.8 to below 2.5 g/10 min,
   (b) a xylene cold soluble content (XCS) determined according to ISO 16152 (25° C.) in the range of 25.0 to 35.0 wt. % based on the propylene copolymer, and
   (c) a comonomer content in the range of more than 4.5 to 10.0 wt. % based on the propylene copolymer,
   wherein further:
   (d) the comonomer content of xylene cold soluble (XCS) fraction of the propylene copolymer is in the range of 12.0 to 22.0 wt. % based on the xylene cold soluble (XCS) fraction of the propylene copolymer, and
   (e) the xylene cold insoluble (XCI) fraction of the propylene copolymer has a polydispersity (Mw/Mn) of more than 4.9 to 10.0.

4. The propylene copolymer according to claim 3, wherein the intrinsic viscosity (IV) determined according to DIN ISO 1628/1 (in decalin at 135° C.) of the xylene cold soluble (XCS) fraction of the propylene copolymer is in the range of more than 1.5 to below 3.0 dl/g.

5. The propylene copolymer according to claim 1, wherein the propylene copolymer:
   (a) comprises an α-nucleating agent, and/or
   (b) has a hexane soluble content of below 5.5 wt. % based on the propylene copolymer, and/or
   (c) has a xylene cold insoluble (XCI) fraction with a comonomer content in the range of 3.0 to 7.0 wt. % based on the xylene cold insoluble (XCI) fraction of the propylene copolymer.

6. The propylene copolymer according to claim 1, wherein the propylene copolymer fulfills:
(a) inequation (I):

$$\frac{Co(\text{total})}{Co(XCS)} \leq 0.55 \qquad (I)$$

wherein;
Co (total) is the comonomer content [wt. % based on the propylene copolymer] of the propylene copolymer,
Co (XCS) is the comonomer content [wt. % based on the xylene cold soluble (XCS) fraction of the propylene copolymer] of the xylene cold soluble fraction (XCS) of the propylene copolymer; and/or
(b) inequation (II):

$$2.8 \leq \frac{Co(XCS)}{Co(XCI)} \leq 5.5 \qquad (II)$$

wherein;
Co (XCS) is the comonomer content [wt. % based on the xylene cold soluble (XCS) fraction of the propylene copolymer] of the xylene cold soluble (XCS) of the propylene copolymer, and
Co (XCI) is the comonomer content [wt. % based on the xylene cold insoluble (XCI) fraction of the propylene copolymer] of the xylene cold insoluble (XCI) of the propylene copolymer.

7. The propylene copolymer according to claim 1, wherein the propylene copolymer has a melting temperature Tm determined by differential scanning calorimetry (DSC) in the range of 148° C. to 159° C.

8. The propylene copolymer according to claim 1, wherein the propylene copolymer is a heterophasic propylene copolymer (RAHECO) comprising a matrix (M) and an elastomeric propylene copolymer (E) dispersed in said matrix (M), wherein said matrix (M) is a random propylene copolymer (R-PP).

9. The propylene copolymer according to claim 8, wherein the weight ratio between the matrix (M) and the elastomeric propylene copolymer (E) is 60/40 to 90/10.

10. The propylene copolymer according to claim 8, wherein the random propylene copolymer (R-PP):
(a) has a comonomer content in the range of 1.0 to 7.0 wt. % based on the random propylene copolymer (R-PP), and/or
(b) fulfills inequation (III):

$$\frac{Co(\text{total})}{Co(RPP)} \geq 1.3 \qquad (III)$$

wherein;
Co (total) is the comonomer content [wt. % based on the propylene copolymer] of the propylene copolymer,
Co (RPP) is the comonomer content [wt. % based on the random propylene copolymer (R-PP)] of the random propylene copolymer (R-PP), and/or
(c) has a xylene cold soluble (XCS) fraction in the range of 8.0 to below 20.0 wt. % based on the random propylene copolymer (R-PP).

11. The propylene copolymer according to claim 8, wherein the random propylene copolymer (R-PP) comprises at least two different random propylene copolymer fractions, wherein further the two random propylene copolymer fractions differ in the comonomer content and/or in the melt flow rate MFR$_2$ (230° C.).

12. The propylene copolymer according to claim 11, wherein:
(a) one fraction of the two random propylene copolymer fractions is the commoner lean fraction and the other fraction is the comonomer rich fraction, wherein further the lean fraction and the rich fraction fulfils inequation (IV):

$$\frac{Co(\text{lean})}{Co(\text{rich})} \leq 0.55 \qquad (IV)$$

wherein;
Co (lean) is the comonomer content [wt. % based on the random propylene copolymer with the lower comonomer content] of the random propylene copolymer fraction with the lower comonomer content,
Co (rich) is the comonomer content [wt. % based on the random propylene copolymer with the higher comonomer content] of the random propylene copolymer fraction with the higher comonomer content; and/or
(b) one fraction of the two random propylene copolymer fractions is the low melt flow rate MFR$_2$ (230° C.) fraction and the other fraction is the high melt flow rate MFR$_2$ (230° C.) fraction, wherein further the low flow fraction and the high flow fraction fulfils inequation (V)

$$\frac{MFR(\text{high})}{MFR(\text{low})} \geq 1.80$$

wherein;
MFR (high) is the melt flow rate MFR$_2$ (230° C.) [g/10 min] of the random propylene copolymer fraction with the higher melt flow rate MFR$_2$ (230° C.),
MFR (low) is the melt flow rate MFR$_2$ (230° C.) [g/10 min] of the random propylene copolymer fraction with the lower melt flow rate MFR$_2$ (230° C.).

13. The propylene copolymer according to claim 11, wherein the two random propylene copolymer fractions are a first random propylene copolymer fraction (R-PP1) and a second random propylene copolymer fraction (R-PP2), wherein further:
(a) the first random propylene copolymer fraction (R-PP1) has a higher comonomer content and melt flow rate MFR$_2$ (230° C.) than the second random propylene copolymer fraction (R-PP2); or
(b) the second random propylene copolymer fraction (R-PP2) has a higher comonomer content and melt flow rate MFR$_2$ (230° C.) than the first random propylene copolymer fraction (R-PP1); or
(c) the first random propylene copolymer fraction (R-PP1) has a higher comonomer content but a lower melt flow rate MFR$_2$ (230° C.) than the second random propylene copolymer fraction (R-PP2); or
(d) the second random propylene copolymer fraction (R-PP2) has a higher comonomer content but a lower melt flow rate MFR$_2$ (230° C.) than the first random propylene copolymer fraction (R-PP1).

14. The propylene copolymer according to claim 13, wherein:

(a) the weight ratio between the first random propylene copolymer fraction (R-PP1) and the second random propylene copolymer fraction (R-PP2) is 20/80 to 80/20, and/or
(b) the first random propylene copolymer fraction (R-PP1) has a comonomer content in the range 0.2 to 4.0 wt. % based on the first random propylene copolymer fraction (R-PP1), and/or
(c) the second random propylene copolymer fraction (R-PP2) has a comonomer content in the range 1.0 to 12.0 wt. % based on the second random propylene copolymer fraction (R-PP2).

15. The propylene copolymer according to claim 8, wherein the elastomeric propylene copolymer (E) has a comonomer content in the range of 12.0 to below 25.0 wt. % based on the elastomeric propylene copolymer (E).

16. A blow molded article comprising a propylene copolymer according to claim 1.

17. The blow molded article according to claim 16, wherein the article is a bottle.

* * * * *